US011884504B2

(12) United States Patent
Murata

(10) Patent No.: US 11,884,504 B2
(45) Date of Patent: Jan. 30, 2024

(54) SHEET CONVEYING DEVICE CAPABLE OF PREVENTING PAPER JAM, IMAGE READING APPARATUS, SHEET CONVEYING METHOD

(71) Applicant: KYOCERA Document Solutions Inc., Osaka (JP)

(72) Inventor: Takuro Murata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 308 days.

(21) Appl. No.: 17/457,863

(22) Filed: Dec. 6, 2021

(65) Prior Publication Data

US 2022/0185607 A1 Jun. 16, 2022

(30) Foreign Application Priority Data

Dec. 10, 2020 (JP) ................................ 2020-204904

(51) Int. Cl.
*B65H 7/18* (2006.01)
*B65H 7/06* (2006.01)
(Continued)

(52) U.S. Cl.
CPC ................ *B65H 7/18* (2013.01); *B65H 3/04* (2013.01); *B65H 5/062* (2013.01); *B65H 7/02* (2013.01); *B65H 7/06* (2013.01); *G03G 15/70* (2013.01); *B65H 2511/11* (2013.01); *B65H 2511/13* (2013.01); *B65H 2511/414* (2013.01);
(Continued)

(58) Field of Classification Search
CPC . B65H 3/04; B65H 3/047; B65H 3/06; B65H 3/5261; B65H 5/06; B65H 5/062; B65H 7/00; B65H 7/02; B65H 7/04; B65H 7/18; B65H 2511/11; B65H 2511/13; B65H 2511/414; B65H 2513/512
See application file for complete search history.

(56) References Cited

U.S. PATENT DOCUMENTS

| | | | | |
|---|---|---|---|---|
| 10,562,724 | B2 * | 2/2020 | Kawamura | B65H 7/125 |
| 2004/0223797 | A1 * | 11/2004 | Ueda | B65H 7/00 399/388 |

(Continued)

FOREIGN PATENT DOCUMENTS

| | | | |
|---|---|---|---|
| JP | 2018108889 | A | 7/2018 |

*Primary Examiner* — Prasad V Gokhale
(74) *Attorney, Agent, or Firm* — Alleman Hall Creasman & Tuttle LLP

(57) ABSTRACT

A sheet conveying device includes a separation member, a second conveyance member, a third conveyance member, and a first drive control portion. The separation member separates a sheet in contact with a first conveyance member from another at a first position where the first conveyance member comes into contact with the sheet. The second and third conveyance members are respectively downstream of the first and second positions. The first drive control portion stops driving the first conveyance member (1) after the leading edge of the sheet reaches the second position and before the trailing edge of the sheet passes through the first position when the sheet length is not exceeding a specific distance based on a distance between the first and third positions and (2) after the leading edge reaches the third position and before the trailing edge passes through the first position when the length exceeds the specific distance.

8 Claims, 8 Drawing Sheets

(51) Int. Cl.
*G03G 15/00* (2006.01)
*B65H 5/06* (2006.01)
*B65H 3/04* (2006.01)
*B65H 7/02* (2006.01)

(52) U.S. Cl.
CPC .... *B65H 2513/512* (2013.01); *B65H 2601/11* (2013.01); *G03G 2215/00548* (2013.01)

(56) References Cited

U.S. PATENT DOCUMENTS

2017/0269533 A1* 9/2017 Shoji .................... B65H 3/0684
2018/0198943 A1 7/2018 Yoshikaie et al.
2021/0009372 A1* 1/2021 Suga ........................ B65H 7/02

* cited by examiner

SHEET CONVEYING DEVICE CAPABLE OF PREVENTING PAPER JAM, IMAGE READING APPARATUS, SHEET CONVEYING METHOD

INCORPORATION BY REFERENCE

This application is based upon and claims the benefit of priority from the corresponding Japanese Patent Application No. 2020-204904 filed on Dec. 10, 2020, the entire contents of which are incorporated herein by reference.

BACKGROUND

The present disclosure relates to a sheet conveying device, an image reading apparatus, and a sheet conveying method.

There is known an image reading apparatus provided with an ADF (Automatic Document Feeder) that conveys document sheets to be read. For example, the ADF includes a sheet feed belt, a separation roller, a registration roller and a conveying roller. The sheet feed belt comes into contact with the document sheets to convey the document sheets downstream in a conveying direction. The separation roller forms a nip portion between the separation roller and the sheet feed belt and separates a document sheet that is in contact with the sheet feed belt in the plurality of document sheets conveyed to the nip portion from another document sheet. The registration roller is disposed downstream of the sheet feed belt in the conveying direction to convey the document sheets. The conveying roller is disposed downstream of the registration roller in the conveying direction to convey the document sheets to a position where images are read.

There is also known an image reading apparatus that changes control over how the document sheets are fed depending on the lengths of the preceding document sheets in the conveying direction.

SUMMARY

A sheet conveying device according to an aspect of the present disclosure includes a first conveyance member, a separation member, a second conveyance member, a third conveyance member, a determination processing portion, and a first drive control portion. The first conveyance member is configured to come into contact with a sheet conveyed in a conveying direction set in advance to convey the sheet downstream in the conveying direction. The separation member is disposed to face the first conveyance member with a first position therebetween and biased toward the first position, the first conveyance member coming into contact with the sheet at the first position. The separation member is configured to separate a first sheet that in contact with the first conveyance member from a second sheet that is different from the first sheet, the sheet being one of a plurality of sheets conveyed in the conveying direction, the plurality of sheets including the first and second sheets and being conveyed to the first position. The second conveyance member is configured to come into contact with the sheet at a second position downstream of the first position in the conveying direction to convey the sheet downstream in the conveying direction. The third conveyance member is configured to come into contact with the sheet at a third position downstream of the second position in the conveying direction to convey the sheet downstream in the conveying direction. The determination processing portion is configured to determine whether or not a length of the sheet in the conveying direction is shorter than or equal to a specific distance based on a distance of a section from the first position to the third position on a conveyance route of the sheet. The first drive control portion is, in a case where the determination processing portion determines that the length is shorter than or equal to the specific distance, configured to stop driving the first conveyance member after a leading edge of the sheet in the conveying direction reaches the second position and before a trailing edge of the sheet in the conveying direction passes through the first position, and in a case where the determination processing portion determines that the length exceeds the specific distance, configured to stop driving the first conveyance member after the leading edge reaches the third position and before the trailing edge passes through the first position.

An image reading apparatus according to another aspect of the present disclosure includes the sheet conveying device and an image reading portion. The image reading portion is configured to read an image on the sheet conveyed by the sheet conveying device.

A sheet conveying method according to another aspect of the present disclosure is performed by a sheet conveying device including a first conveyance member configured to come into contact with a sheet conveyed in a conveying direction set in advance to convey the sheet downstream in the conveying direction; a separation member disposed to face the first conveyance member with a first position therebetween and biased toward the first position, the first conveyance member coming into contact with the sheet at the first position, the separation member being configured to separate a first sheet that is in contact with the first conveyance member from a second sheet that is different from the first sheet, the sheet being one of a plurality of sheets conveyed in the conveying direction, the plurality of sheets including the first and second sheets and being conveyed to the first position; a second conveyance member configured to come into contact with the sheet at a second position downstream of the first position in the conveying direction to convey the sheet downstream in the conveying direction; and a third conveyance member configured to come into contact with the sheet at a third position downstream of the second position in the conveying direction to convey the sheet downstream in the conveying direction. The sheet conveying method includes a determination step and a drive control step. In the determination step, it is determined whether or not a length of the sheet in the conveying direction is shorter than or equal to a specific distance based on a distance of a section from the first position to the third position on a conveyance route of the sheet. In the drive control step, the driving of the first conveyance member is stopped after a leading edge of the sheet in the conveying direction reaches the second position and before a trailing edge of the sheet in the conveying direction passes through the first position in a case where it is determined that the length is shorter than or equal to the specific distance in the determination step, and the driving of the first conveyance member is stopped after the leading edge reaches the third position and before the trailing edge passes through the first position in a case where it is determined that the length exceeds the specific distance in the determination step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

[Configuration of Image Forming Apparatus 100]

First, the configuration of an image forming apparatus 100 according to an embodiment of the present disclosure will be described with reference to FIGS. 1 and 2. Here, FIG. 1 is a cross-sectional view showing the configuration of the image forming apparatus 100.

The image forming apparatus 100 is a multifunction peripheral with multiple functions such as a scan function of reading images from document sheets, a print function of forming images on the basis of image data, a facsimile function, and a copy function. The image forming apparatus 100 is an example of an image reading apparatus of the present disclosure. The image reading apparatus of the present disclosure may be a scanner, a facsimile apparatus, a copier, or the like.

Figure 1:
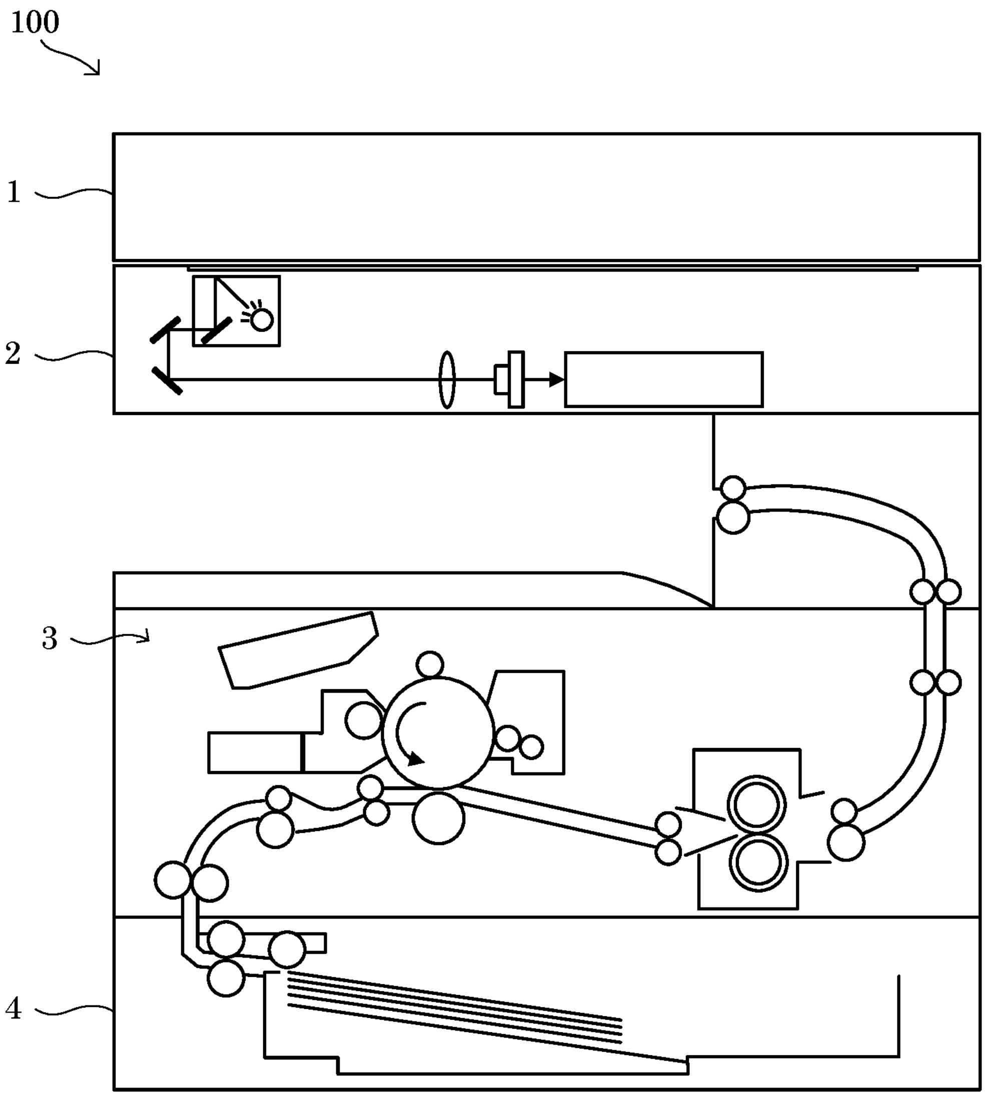
FIG. 1 shows the configuration of an image forming apparatus according to an embodiment of the present disclosure.
Figure 2:
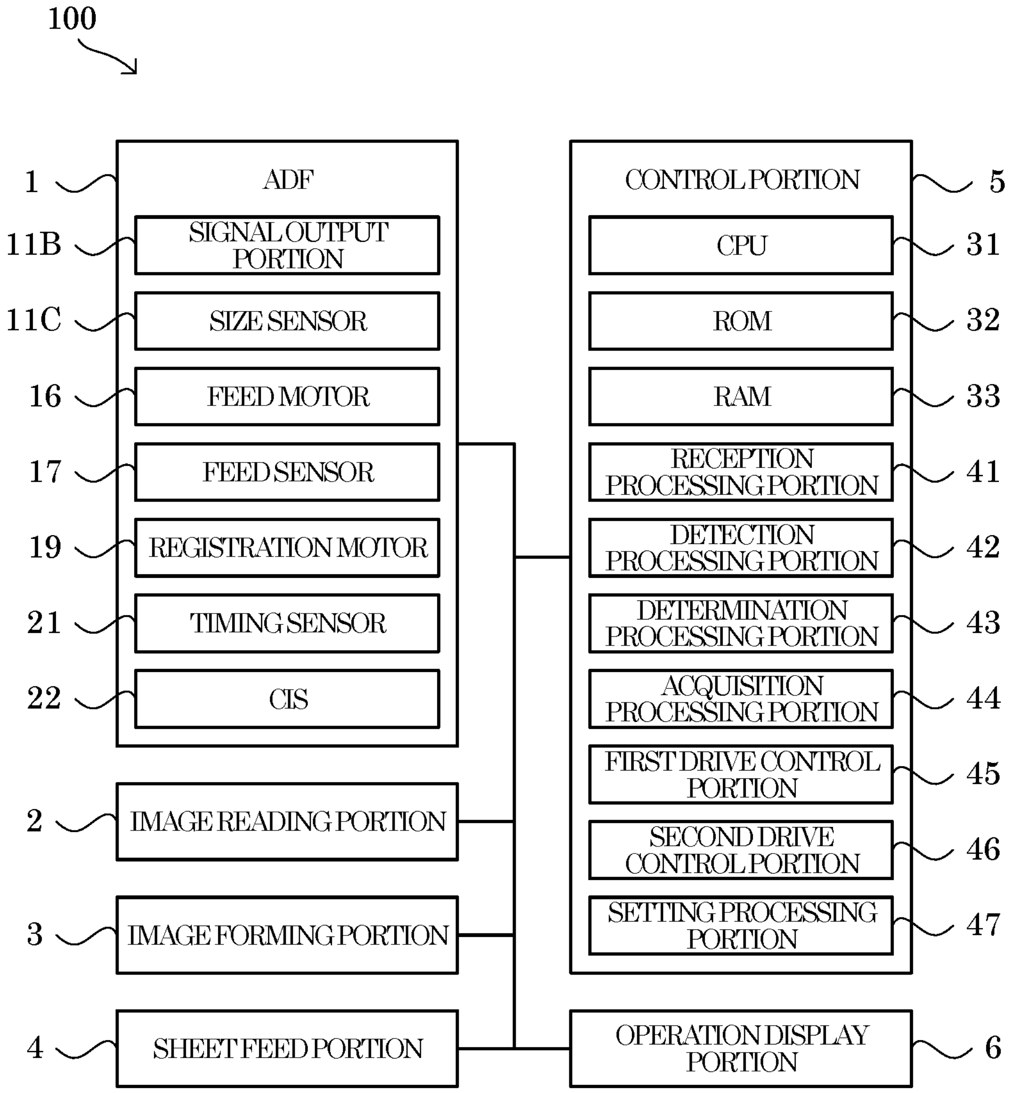
FIG. 2 is a block diagram showing the system configuration of the image forming apparatus according to the embodiment of the present disclosure.

As shown in FIGS. 1 and 2, the image forming apparatus 100 includes an ADF (Automatic Document Feeder) 1, an image reading portion 2, an image forming portion 3, a sheet feed portion 4, a control portion 5, and an operation display portion 6.

The ADF 1 conveys document sheets (an example of a sheet of the present disclosure) to be read by the scan function.

The image reading portion 2 implements the scan function. For example, the image reading portion 2 includes a document sheet table, a light source, a plurality of mirrors, an optical lens, and a CCD (Charge Coupled Device). The image reading portion 2 reads the images on the document sheets conveyed by the ADF 1 and outputs image data corresponding to the read images.

The image forming portion 3 implements the print function. For example, the image forming portion 3 forms images on sheets supplied by the sheet feed portion 4 by electrophotographic method. For example, the image forming portion 3 includes a photoconductor drum, a charging roller, a laser scanning unit, a developing device, a transfer roller, a cleaning device, a fixing device, and an output tray.

The sheet feed portion 4 supplies the sheets to the image forming portion 3. For example, the sheet feed portion 4 includes a sheet feed cassette, a manual feed tray, a sheet conveyance path, and a plurality of conveying rollers.

The control portion 5 provides integrated control for the image forming apparatus 100.

The operation display portion 6 is a user interface of the image forming apparatus 100. For example, the operation display portion 6 includes a display portion and an operation portion. The display portion includes a liquid crystal display and displays various types of information according to control instructions from the control portion 5. The operation portion includes operational keys and a touch panel for inputting various types of information to the control portion 5 according to user operations.

[Configuration of ADF 1]

Figure 3:
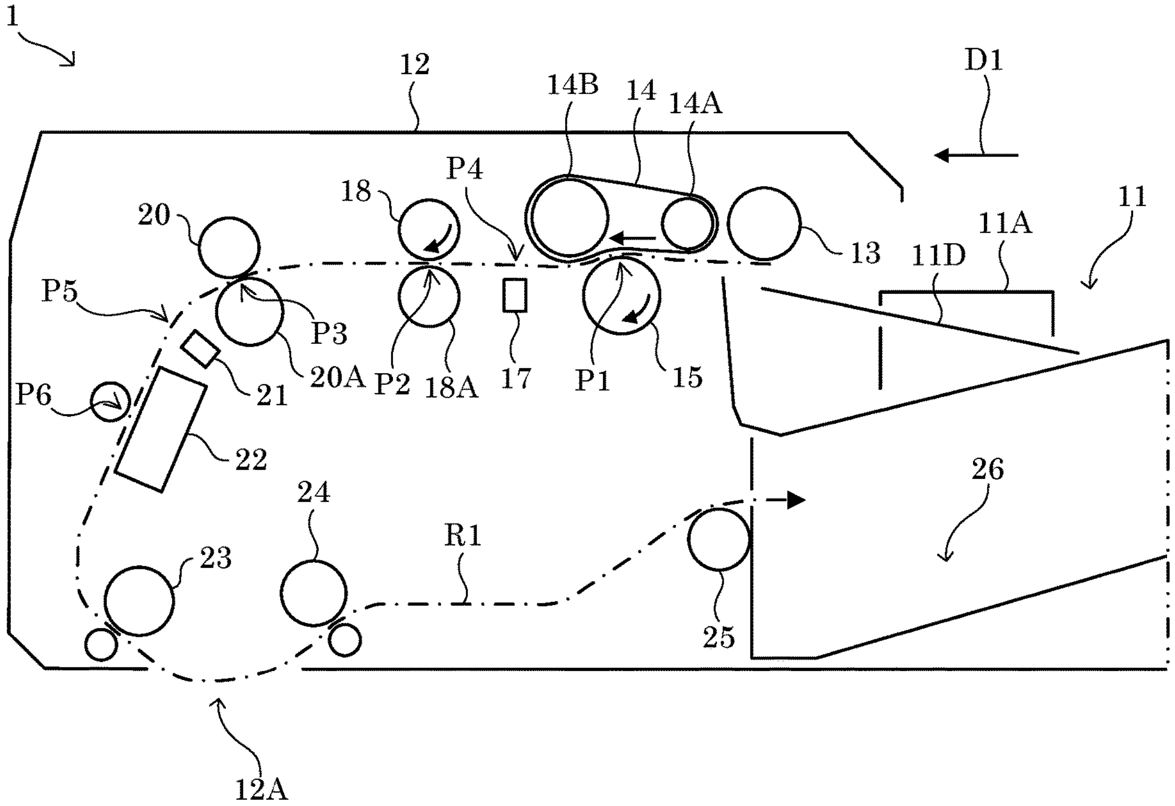
FIG. 3 shows the configuration of an ADF of the image forming apparatus according to the embodiment of the present disclosure.

Next, the configuration of the ADF 1 will be described with reference to FIGS. 2 and 3. Here, FIG. 3 is a cross-sectional view showing the configuration of the ADF 1. It is noted that a conveyance route R1 of the document sheets conveyed by the ADF 1 is indicated by alternate long and short dash line in FIG. 3.

As shown in FIGS. 2 and 3, the ADF 1 includes a document sheet placing portion 11, a housing 12, a pickup roller 13, a sheet feed belt 14, a separation roller 15, a feed motor 16, a feed sensor 17, a registration roller 18, a registration motor 19, a first conveying roller 20, a timing sensor 21, a CIS (Contact Image Sensor) 22, a second conveying roller 23, a third conveying roller 24, a sheet discharge roller 25, and a sheet discharge portion 26.

The document sheets to be conveyed are placed on the document sheet placing portion 11. In the ADF 1, the document sheets placed on the document sheet placing portion 11 are conveyed in a conveying direction D1 shown in FIG. 3.

The document sheet placing portion 11 is provided with a pair of side guides 11A (see FIG. 3). In the document sheet placing portion 11, each of the side guides 11A is movable in the width direction orthogonal to the conveying direction D1. For example, the pair of side guides 11A are each connected to a rack and pinion (not shown), and thereby one of the side guides moves in a first direction parallel to the width direction in conjunction with the movement of the other in a second direction opposite the first direction. The pair of side guides 11A hold the document sheets placed on the document sheet placing portion 11 from both sides in the width direction to regulate the position of the document sheets in the width direction.

The document sheet placing portion 11 is further provided with a signal output portion 11B (see FIG. 2). The signal output portion 11B outputs an electrical signal according to the separation distance between the pair of side guides 11A. For example, the signal output portion 11B is an electronic circuit including a variable resistor having a resistance that varies depending on the rotation of the pinion, and outputs an electrical signal according to the resistance of the variable resistor.

The document sheet placing portion 11 is further provided with a size sensor 11C (see FIG. 2). The size sensor 11C can detect the document sheets at a predetermined reference position on the document sheet placing portion 11. For example, the size sensor 11C is a reflective optical sensor. For example, the reference position is exposed to the outside when A4-size document sheets are placed on the document sheet placing portion 11 in portrait orientation, and is covered by B4-size document sheets when the document sheets are placed in portrait orientation. The signal output portion 11B and the size sensor 11C are used to determine the sizes of the document sheets placed on the document sheet placing portion 11.

The document sheet placing portion 11 is further provided with a lift plate 11D (see FIG. 3). The lift plate 11D lifts the document sheets placed on the document sheet placing portion 11 to a contact position with the pickup roller 13.

The housing 12 stores rollers and the like used to convey the document sheets. The housing 12 includes therein a conveyance path of the document sheets extending from the document sheet placing portion 11 to the sheet discharge portion 26. In the ADF 1, the document sheets are conveyed along the conveyance route R1 (see FIG. 3) extending from the document sheet placing portion 11 to the sheet discharge portion 26 through the conveyance path.

As shown in FIG. 3, the housing 12 has an opening 12A at its bottom. Part of the conveyance path is exposed to the outside through the opening 12A. At the opening 12A, the image reading portion 2 reads the images on the document sheets conveyed by the ADF 1.

The pickup roller 13 comes into contact with first faces of the document sheets lifted by the lift plate 11D to convey the document sheets in the conveying direction D1. It is noted that the first faces corresponds to the top faces of the document sheets placed on the document sheet placing portion 11.

The sheet feed belt 14 comes into contact with the document sheets conveyed by the pickup roller 13 in the conveying direction D1 to convey the document sheets downstream in the conveying direction D1. As shown in FIG. 3, the sheet feed belt 14 is disposed over the conveyance route R1 and comes into contact with the first faces of the document sheets conveyed by the pickup roller 13. The sheet feed belt 14 is stretched by a drive roller 14A (see FIG. 3) and a driven roller 14B (see FIG. 3). As shown in FIG. 3, the drive roller 14A and the driven roller 14B are disposed in this order in the conveying direction D1. The document sheets conveyed by the pickup roller 13 come into contact with the sheet feed belt 14 at a position downstream of the drive roller 14A in the conveying direction D1 and upstream of the driven roller 14B in the conveying direction D1. The sheet feed belt 14 is an example of a first conveyance member of the present disclosure. It is noted that the drive roller 14A and the driven roller 14B may be disposed in reverse order. In addition, the first conveyance member of the present disclosure may be a roller-like member.

The sheet feed belt 14 comes into contact with the document sheets at a first position P1 (see FIG. 3). The separation roller 15 is disposed to face the sheet feed belt 14 with the first position P1 therebetween. As shown in FIG. 3, the separation roller 15 is disposed under the conveyance route R1. The separation roller 15 is biased toward the first position P1 by a coil spring (not shown). The sheet feed belt 14 is curved upward at the first position P1 by the separation roller 15 biased toward the first position P1. The contact portion at which the sheet feed belt 14 and the separation roller 15 are in contact with each other functions as a nip portion that nips the document sheets. The separation roller 15 separates a first document sheet (an example of a first sheet of the present disclosure) that is in contact with the sheet feed belt 14 in the plurality of document sheets conveyed to the first position P1 from a second document sheet (an example of a second sheet of the present disclosure) that is different from the first document sheet. The separation roller 15 is an example of a separation member of the present disclosure.

For example, the separation roller 15 is driven by a motor (not shown) in a direction of an arrow shown in FIG. 3 (clockwise). In addition, the separation roller 15 is connected to a torque limiter (not shown) and is subjected to a rotational driving force provided by the motor through the torque limiter. When the torque transmitted from the sheet feed belt 14 exceeds a predetermined value, the torque limiter blocks the transmission path of the rotational driving force from the motor to the separation roller 15 so that the separation roller 15 is driven by the sheet feed belt 14.

The feed motor 16 drives the sheet feed belt 14. Specifically, the feed motor 16 is connected to the drive roller 14A through a power transmission path (not shown) to provide a rotational driving force for the drive roller 14A. This rotates the drive roller 14A to drive the sheet feed belt 14 in a direction of an arrow shown in FIG. 3 (clockwise).

The registration roller 18 comes into contact with the document sheets at a second position P2 (see FIG. 3) downstream of the first position P1 in the conveying direction D1 to convey the document sheets downstream in the conveying direction D1. As shown in FIG. 3, the registration roller 18 is disposed over the conveyance route R1 and comes into contact with the first faces of the document sheets conveyed by the sheet feed belt 14. A driven roller 18A is disposed under the registration roller 18 to face the registration roller 18 with the conveyance route R1 therebetween. The driven roller 18A is disposed to be in contact with the registration roller 18. The second position P2 corresponds to a contact position of the registration roller 18 and the driven roller 18A. The registration roller 18 is an example of a second conveyance member of the present disclosure.

The registration motor 19 drives the registration roller 18. Specifically, the registration motor 19 is connected to the registration roller 18 through a power transmission path (not shown) to provide a rotational driving force for the registration roller 18. This drives the registration roller 18 in a direction of an arrow shown in FIG. 3 (clockwise).

The feed sensor 17 detects the leading edges of the document sheets in the conveying direction D1 at a fourth position P4 (see FIG. 3) downstream of the first position P1 in the conveying direction D1 and upstream of the second position P2 in the conveying direction D1. For example, the feed sensor 17 is a reflective optical sensor. The feed sensor 17 is an example of a sensing portion of the present disclosure.

The first conveying roller 20 comes into contact with the document sheets at a third position P3 (see FIG. 3) downstream of the second position P2 in the conveying direction D1 to convey the document sheets downstream in the conveying direction D1. As shown in FIG. 3, the first conveying roller 20 is disposed over the conveyance route R1 and comes into contact with the first faces of the document sheets conveyed by the registration roller 18. A driven roller 20A is disposed under the first conveying roller 20 to face the first conveying roller 20 with the conveyance route R1 therebetween. The driven roller 20A is disposed to be in contact with the first conveying roller 20. The third position P3 corresponds to a contact position of the first conveying roller 20 and the driven roller 20A. The first conveying roller 20 is an example of a third conveyance member of the present disclosure.

The CIS 22 reads the images on second faces, opposite the first faces, of the document sheets at a sixth position P6 (see FIG. 3) downstream of the third position P3 in the conveying direction D1.

The timing sensor 21 detects the leading edges of the document sheets in the conveying direction D1 at a fifth position P5 (see FIG. 3) downstream of the third position P3 in the conveying direction D1 and upstream of the sixth position P6 in the conveying direction D1. For example, the timing sensor 21 is a reflective optical sensor. The timing sensor 21 is used to control the operation of the CIS 22.

The second conveying roller 23 conveys the document sheets to the opening 12A after the CIS 22 reads the images on the second faces. At the opening 12A, the image reading portion 2 reads the images on the first faces of the document sheets. The third conveying roller 24 conveys the document sheets that have passed through the opening 12A to the sheet discharge roller 25. The sheet discharge roller 25 discharges the document sheets conveyed by the third conveying roller 24 to the sheet discharge portion 26. The sheet discharge portion 26 receives the document sheets conveyed along the conveyance route R1 and discharged thereto.

[Configuration of Control Portion 5]

Next, the configuration of the control portion 5 will be described with reference to FIG. 2.

As shown in FIG. 2, the control portion 5 includes a CPU 31, a ROM 32, and a RAM 33.

The CPU 31 is a processor that executes various types of arithmetic processes. The ROM 32 is a nonvolatile storage device storing in advance information including control programs to cause the CPU 31 to execute various types of processes. The RAM 33 is a volatile storage device used as a temporary memory (work area) for the various types of processes executed by the CPU 31.

In the control portion 5, the CPU 31 executes the various types of control programs stored in the ROM 32 in advance. This causes the control portion 5 to provide integrated control for the image forming apparatus 100. It is noted that the control portion 5 may be composed of an electronic circuit such as an integrated circuit (ASIC). In addition, the control portion 5 may be provided separately from a main control portion that provides integrated control for the image forming apparatus 100.

Occasionally, the registration roller 18 slips on the surfaces of the document sheets and causes delays in conveying the document sheets. When a long delay occurs, a sheet feed retry involving pausing and resuming of the driving of the registration roller 18 is performed. For example, the sheet feed retry is performed when the timing sensor 21 does not detect the leading edge of a document sheet within a predetermined period of time after the feed sensor 17 detects the leading edge of the document sheet. The sheet feed retry causes a delay in conveying the document sheet accordingly and thus reduces the productivity of the image forming apparatus 100. To prevent the conveyance delay caused by the slip of the registration roller 18, the sheet feed belt 14 may continue to convey the document sheet until the leading edge of the document sheet reaches the third position P3.

However, in a case where the length of the document sheets in the conveying direction D1 is short, the trailing edge of a document sheet passes through the first position P1 before the leading edge of the document sheet reaches the third position P3. In this case, the following document sheet is conveyed downstream of the first position P1 in the conveying direction D1 until the driving of the sheet feed belt 14 is stopped, and is halted between the sheet feed belt 14 and the separation roller 15. This creates a curved bend in the following document sheet and causes a paper jam while the following document sheet is conveyed.

By contrast, the image forming apparatus 100 according to the embodiment of the present disclosure can prevent paper jams while preventing a reduction in the productivity as described below.

As shown in FIG. 2, the control portion 5 includes a reception processing portion 41, a detection processing portion 42, a determination processing portion 43, an acquisition processing portion 44, a first drive control portion 45, a second drive control portion 46, and a setting processing portion 47.

Figure 4:
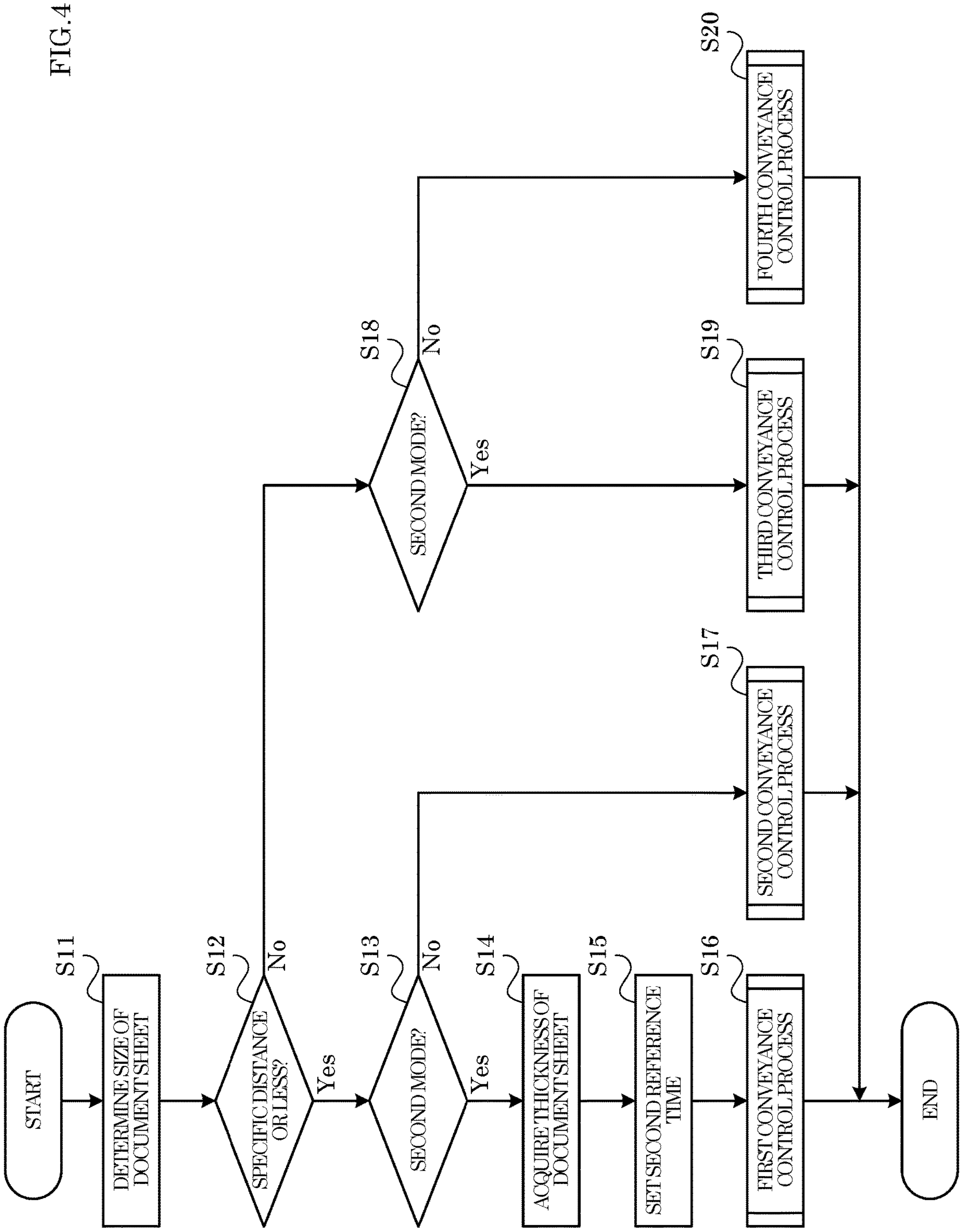
FIG. 4 is a flowchart showing an example of a conveyance control switching process executed by the image forming apparatus according to the embodiment of the present disclosure.

Specifically, the ROM 32 stores in advance a conveyance control program to cause the CPU 31 to execute a conveyance control switching process (described below; see FIG. 4). The control portion 5 executes the conveyance control program stored in the ROM 32 and thereby functions as the reception processing portion 41, the detection processing portion 42, the determination processing portion 43, the acquisition processing portion 44, the first drive control portion 45, the second drive control portion 46, and the setting processing portion 47. Here, a device including the ADF 1 and the control portion 5 is an example of a sheet conveying device of the present disclosure.

The reception processing portion 41 receives setting operations for specifying setting items regarding the conveyance of document sheets by the ADF 1.

For example, the reception processing portion 41 causes the operation display portion 6 to display a setting screen used for the setting operations in response to a predetermined call operation performed on the operation display portion 6. The conveyance mode of the document sheets, which is one of the setting items, can be set on the setting screen. In addition, the thickness of the document sheets, which is also one of the setting items, can be set on the setting screen.

The conveyance mode can be set to a first mode or a second mode on the setting screen. In the first mode, skew correction is performed on the document sheets using the registration roller 18. The skew correction is not performed in the second mode. The first mode is an example of a specific mode of the present disclosure.

The thickness of the document sheets can be set to one of three options of "thick", "normal", and "thin" on the setting screen. It is noted that the thickness of the document sheets may be set using numerical values or the types of paper.

It is noted that the size of the document sheets or the length of the document sheets in the conveying direction D1 may be able to be set on the setting screen. In this case, the ADF 1 may not be necessarily provided with the signal output portion 11B and the size sensor 11C. In addition, the conveyance mode may not be able to be set on the setting screen. In this case, the ADF 1 may convey the document sheets in either the first mode or the second mode at all times.

After receiving the setting operations, the reception processing portion 41 receives execution operations for executing a document sheet reading process involving conveying the document sheets placed on the document sheet placing portion 11 one by one and reading the images on the conveyed document sheets.

For example, upon receiving the setting operations, the reception processing portion 41 causes the operation display portion 6 to display an execution operation screen used for the execution operations. For example, the details of the setting items are displayed on the execution operation screen.

The detection processing portion 42 determines the size of the document sheets placed on the document sheet placing portion 11.

For example, the detection processing portion 42 determines the size of the document sheets placed on the document sheet placing portion 11 in the following manner.

First, the detection processing portion 42 determines the length, in the width direction, of the document sheets placed on the document sheet placing portion 11 on the basis of the electrical signal output from the signal output portion 11B. Next, from a plurality of standardized sizes set in advance, the detection processing portion 42 extracts one or more standardized sizes having widths corresponding to the length, in the width direction, of the document sheets placed on the document sheet placing portion 11.

In a case where only one standardized size is extracted, the detection processing portion 42 determines that the standardized size is the size of the document sheets placed on the document sheet placing portion 11. In a case where two or more standardized sizes are extracted, the detection processing portion 42 determines that one of the standardized sizes narrowed down on the basis of the detection result by the size sensor 11C is the size of the document sheets placed on the document sheet placing portion 11.

The determination processing portion 43 determines whether or not the length of the document sheets in the conveying direction D1 is shorter than or equal to a specific distance based on the distance of a specific section from the first position P1 to the third position P3 on the conveyance route R1 (see FIG. 3).

For example, the specific distance is obtained by adding a first distance set in advance to the distance of the specific section.

For example, the determination processing portion 43 determines whether or not the length of the document sheets in the conveying direction D1 is shorter than or equal to the specific distance on the basis of the size of the document sheets determined by the detection processing portion 42.

It is noted that the specific distance may be shorter than or equal to the distance of the specific section. In addition, the determination processing portion 43 may determine whether or not the length of the document sheets in the conveying direction D1 is shorter than or equal to the specific distance on the basis of the size of the document sheets or the length of the document sheets in the conveying direction D1 set on the setting screen. In this case, the control portion 5 may not necessarily include the detection processing portion 42.

The acquisition processing portion 44 acquires the thickness of the document sheets.

For example, the acquisition processing portion 44 acquires the thickness of the document sheets set on the setting screen as the thickness of the document sheets placed on the document sheet placing portion 11.

It is noted that a thickness sensor for determining the thickness of the document sheets may be disposed on the conveyance route R1 (see FIG. 3) between the first position P1 and the second position P2. For example, the thickness sensor may be an optical sensor or an ultrasound sensor. In this case, the acquisition processing portion 44 may acquire the thickness of the document sheets using the thickness sensor.

For example, in the case where the document sheet reading process is executed, the acquisition processing portion 44 may execute a process of conveying the top document sheet on the document sheet placing portion 11 to a detection position of the thickness sensor, determining the thickness of the document sheet using the thickness sensor, and returning the document sheet to the first position P1 prior to the document sheet reading process.

In the case where the conveyance mode is the first mode, the second drive control portion 46 starts driving the registration roller 18 when the time elapsed since the detection of the leading edge of a document sheet by the feed sensor 17 exceeds a first reference time set in advance.

Here, the first reference time is longer than a conveyance time taken by the sheet feed belt 14 to convey the document sheet from the fourth position P4 (see FIG. 3) to the second position P2. In addition, after the document sheet conveyed by the sheet feed belt 14 comes into contact with the contact portion of the registration roller 18 and the driven roller 18A, a predetermined amount of warp can be created in the document sheet during the first reference time. In the skew correction, the driving of the registration roller 18 does not start until the warp is created in the document sheet, and thereby the inclination of the document sheet is corrected with respect to the conveying direction D1.

In the case where the conveyance mode is the second mode, the second drive control portion 46 starts driving the registration roller 18 before the leading edge of the document sheet in the conveying direction D1 reaches the second position P2 (see FIG. 3).

For example, in the case where the conveyance mode is the second mode, the second drive control portion 46 starts driving the registration roller 18 when the feed sensor 17 detects the leading edge of the document sheet.

In the case where the determination processing portion 43 determines that the length of the document sheet in the conveying direction D1 is shorter than or equal to the specific distance, the first drive control portion 45 stops driving the sheet feed belt 14 after the leading edge of the document sheet in the conveying direction D1 has reached the second position P2 (see FIG. 3) and before the trailing edge of the document sheet in the conveying direction D1 passes through the first position P1.

In addition, in the case where the determination processing portion 43 determines that the length of the document sheet in the conveying direction D1 exceeds the specific distance, the first drive control portion 45 stops driving the sheet feed belt 14 after the leading edge of the document sheet in the conveying direction D1 has reached the third position P3 (see FIG. 3) and before the trailing edge of the document sheet in the conveying direction D1 passes through the first position P1.

For example, the first drive control portion 45 determines the timing to stop driving the sheet feed belt 14 on the basis of the time elapsed since the detection of the leading edge of the document sheet by the feed sensor 17.

For example, in the case where the determination processing portion 43 determines that the length of the document sheet in the conveying direction D1 is shorter than or equal to the specific distance while the conveyance mode is the first mode, the first drive control portion 45 stops driving the sheet feed belt 14 when the time elapsed since the detection of the leading edge of the document sheet by the feed sensor 17 exceeds the first reference time. For example, the first drive control portion 45 stops driving the sheet feed belt 14 after a predetermined period of time has passed since the start of the driving of the registration roller 18 by the second drive control portion 46.

In addition, in the case where the determination processing portion 43 determines that the length of the document sheet in the conveying direction D1 is shorter than or equal to the specific distance while the conveyance mode is the second mode, the first drive control portion 45 stops driving the sheet feed belt 14 when the time elapsed since the detection of the leading edge of the document sheet by the feed sensor 17 exceeds a second reference time set in advance. Here, the second reference time is longer than the conveyance time taken by the sheet feed belt 14 to convey the document sheet from the fourth position P4 (see FIG. 3) to the second position P2, and is set by the setting processing portion 47.

In addition, in the case where the determination processing portion 43 determines that the length of the document sheet in the conveying direction D1 exceeds the specific distance while the conveyance mode is the first mode, the first drive control portion 45 stops driving the sheet feed belt 14 when the time elapsed since the detection of the leading edge of the document sheet by the feed sensor 17 exceeds a third reference time set in advance. For example, the third reference time is longer than the sum of the first reference time and a conveyance time taken by the registration roller 18 to convey the document sheet from the second position P2 (see FIG. 3) to the third position P3.

In addition, in the case where the determination processing portion 43 determines that the length of the document sheet in the conveying direction D1 exceeds the specific distance while the conveyance mode is the second mode, the first drive control portion 45 stops driving the sheet feed belt 14 when the time elapsed since the detection of the leading edge of the document sheet by the feed sensor 17 exceeds a fourth reference time set in advance. For example, the fourth reference time is longer than the sum of the conveyance time taken by the sheet feed belt 14 to convey the document sheet from the fourth position P4 (see FIG. 3) to the second position P2 and the conveyance time taken by the registration roller 18 to convey the document sheet from the second position P2 to the third position P3.

It is noted that, in the case where the determination processing portion 43 determines that the length of the document sheet in the conveying direction D1 exceeds the specific distance, the first drive control portion 45 may determine the timing to stop driving the sheet feed belt 14 using the timing sensor 21 (see FIG. 3). For example, the first drive control portion 45 may stop driving the sheet feed belt 14 when the timing sensor 21 detects the leading edge of the document sheet. In this case, the first distance only needs to be longer than or equal to the distance of a section from the third position P3 to the fifth position P5 on the conveyance route R1.

In addition, a document sheet sensor for detecting the leading edge of the document sheet in the conveying direction D1 may be disposed on the conveyance route R1 (see FIG. 3) between the second position P2 and the third position P3. For example, the document sheet sensor is a reflective optical sensor. In this case, in the case where the determination processing portion 43 determines that the length of the document sheet in the conveying direction D1 is shorter than or equal to the specific distance, the first drive control portion 45 may determine the timing to stop driving the sheet feed belt 14 using the document sheet sensor. For example, the first drive control portion 45 may stop driving the sheet feed belt 14 when the document sheet sensor detects the leading edge of the document sheet.

The setting processing portion 47 sets the second reference time on the basis of the thickness of the document sheet acquired by the acquisition processing portion 44.

For example, in the image forming apparatus 100, the ROM 32 stores in advance table data showing correspondence between the thickness of the document sheet and a candidate time serving as a candidate of the second reference time. In the table data, the correspondence between the thickness of the document sheet and the candidate time is established such that the candidate time increases with the thickness of the document sheet. This is because the thicker document sheet causes the sheet feed belt 14 to slip on the surface of the document sheet more easily and thus causes delays in conveying the document sheet more often.

The setting processing portion 47 sets the second reference time using the table data. Specifically, the setting processing portion 47 sets the candidate time associated with the thickness of the document sheet acquired by the acquisition processing portion 44 in the table data as the second reference time.

It is noted that the second reference time may be a fixed value set in advance. In this case, the control portion 5 may not necessarily include the acquisition processing portion 44 and the setting processing portion 47.

[Conveyance Control Switching Process]

A sheet conveying method of the present disclosure will now be described with reference to FIG. 4 using an example procedure of the conveyance control switching process executed by the control portion 5 of the image forming apparatus 100. Here, steps S11, S12, . . . represent the numbers of processing procedures (steps) performed by the control portion 5.

For example, the conveyance control switching process is executed when the execution operations for executing the document sheet reading process are performed on the execution operation screen. In the description below, it is assumed that the conveyance mode and the thickness of the document sheet have been set on the setting screen.

<Step S11>

First, in step S11, the control portion 5 determines the size of the document sheets placed on the document sheet placing portion 11. Here, the process of step S11 is executed by the detection processing portion 42 of the control portion 5.

<Step S12>

In step S12, the control portion 5 determines whether or not the length of the document sheets in the conveying direction D1 is shorter than or equal to the specific distance on the basis of the size of the document sheets determined in step S11. Here, the process of step S12 is an example of a determination step of the present disclosure and is executed by the determination processing portion 43 of the control portion 5.

Upon determining that the length of the document sheets in the conveying direction D1 is shorter than or equal to the specific distance (Yes in step S12), the control portion 5 moves the process to step S13. Upon determining that the length of the document sheets in the conveying direction D1 exceeds the specific distance (No in step S12), the control portion 5 moves the process to step S18.

<Step S13>

In step S13, the control portion 5 determines whether or not the conveyance mode is set to the second mode.

Upon determining that the conveyance mode is set to the second mode (Yes in step S13), the control portion 5 moves the process to step S14. If the conveyance mode is not set to the second mode (No in step S13), the control portion 5 moves the process to step S17.

<Step S14>

In step S14, the control portion 5 acquires the thickness of the document sheets. Here, the process of step S14 is executed by the acquisition processing portion 44 of the control portion 5.

Specifically, the control portion 5 acquires the thickness of the document sheets set on the setting screen as the thickness of the document sheets placed on the document sheet placing portion 11.

<Step S15>

In step S15, the control portion 5 sets the second reference time on the basis of the thickness of the document sheets acquired in step S14. Here, the process of step S15 is executed by the setting processing portion 47 of the control portion 5.

Specifically, the control portion 5 sets the candidate time associated with the thickness of the document sheets acquired in step S14 in the table data as the second reference time.

<Step S16>

In step S16, the control portion 5 executes a first conveyance control process (described below).

<Step S17>

In step S17, the control portion 5 executes a second conveyance control process (described below).

<Step S18>

In step S18, the control portion 5 determines whether or not the conveyance mode is set to the second mode.

Upon determining that the conveyance mode is set to the second mode (Yes in step S18), the control portion 5 moves the process to step S19. If the conveyance mode is not set to the second mode (No in step S18), the control portion 5 moves the process to step S20.

<Step S19>

In step S19, the control portion 5 executes a third conveyance control process (described below).

<Step S20>

In step S20, the control portion 5 executes a fourth conveyance control process (described below).

[First Conveyance Control Process]

Figure 5:
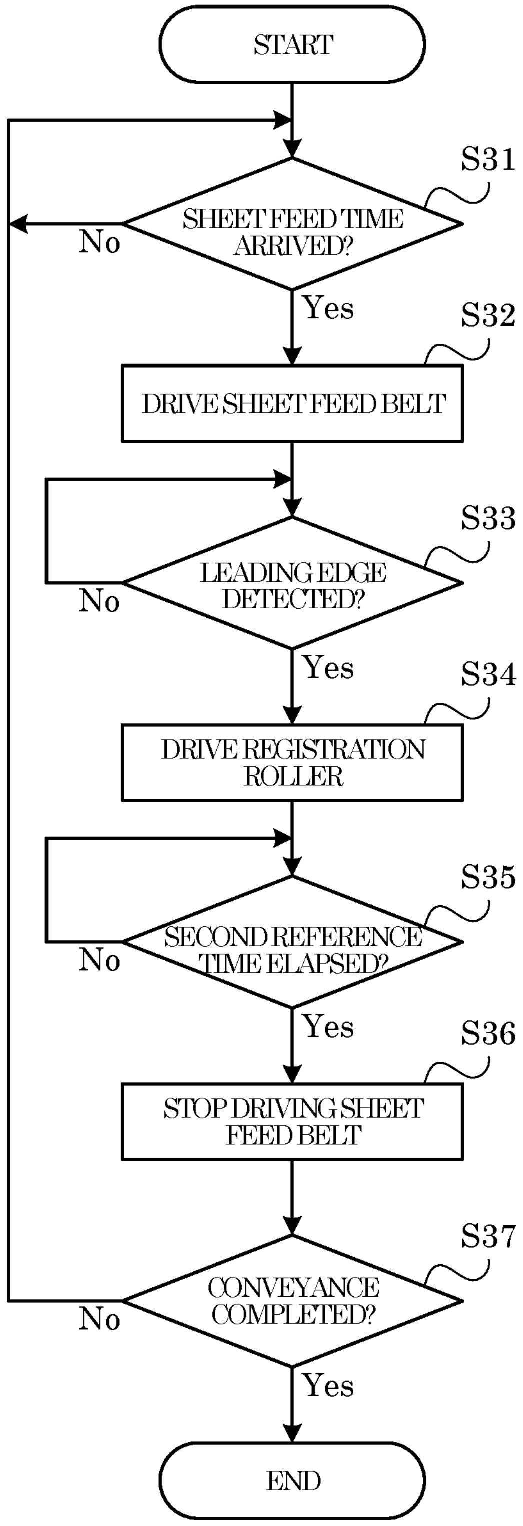
FIG. 5 is a flowchart showing an example of a first conveyance control process executed by the image forming apparatus according to the embodiment of the present disclosure.

Next, the first conveyance control process executed in step S16 of the conveyance control switching process will be described with reference to FIG. 5. The first conveyance control process controls the driving of the sheet feed belt 14 and the registration roller 18. It is noted that the control portion 5 executes a fifth conveyance control process of controlling the driving of the first conveying roller 20, the second conveying roller 23, the third conveying roller 24, and the sheet discharge roller 25 in addition to the first conveyance control process. The control portion 5 also executes a second reading process of reading the images on the second faces of the document sheets using the CIS 22 and a first reading process of reading the images on the first faces of the document sheets using the image reading portion 2 in addition to the first conveyance control process.

<Step S31>

First, in step S31, the control portion 5 determines whether or not a sheet feed time to feed a document sheet has arrived.

Upon determining that the sheet feed time has arrived (Yes in step S31), the control portion 5 moves the process to step S32. If the sheet feed time has not arrived (No in step S31), the control portion 5 waits for the sheet feed time to arrive in step S31.

<Step S32>

In step S32, the control portion 5 starts driving the sheet feed belt 14. Here, the process of step S32 is executed by the first drive control portion 45 of the control portion 5.

Specifically, the control portion 5 starts the feed motor 16 to drive the feed motor 16 at a predetermined speed. This provides the drive roller 14A with the rotational driving force generated by the feed motor 16, and thus the drive roller 14A and the sheet feed belt 14 start being driven.

<Step S33>

In step S33, the control portion 5 determines whether or not the feed sensor 17 has detected the leading edge of the document sheet.

Upon determining that the feed sensor 17 has detected the leading edge of the document sheet (Yes in step S33), the control portion 5 moves the process to step S34. If the leading edge of the document sheet has not been detected (No in step S33), the control portion 5 waits for the feed sensor 17 to detect the leading edge of the document sheet in step S33.

<Step S34>

In step S34, the control portion 5 starts driving the registration roller 18. Here, the process of step S34 is executed by the second drive control portion 46 of the control portion 5.

Specifically, the control portion 5 starts the registration motor 19 to drive the registration motor 19 at a predetermined speed. This provides the registration roller 18 with the rotational driving force generated by the registration motor 19, and thus the registration roller 18 starts being driven.

<Step S35>

In step S35, the control portion 5 determines whether or not the second reference time has passed since the detection of the leading edge of the document sheet in step S33.

Upon determining that the second reference time has passed since the detection of the leading edge of the document sheet in step S33 (Yes in step S35), the control portion 5 moves the process to step S36. If the second reference time has not passed (No in step S35), the control portion 5 waits for the second reference time to pass in step S35.

<Step S36>

In step S36, the control portion 5 stops driving the sheet feed belt 14. Here, the process of step S36 is an example of a drive control step of the present disclosure and is executed by the first drive control portion 45 of the control portion 5.

After executing the process of step S36, the control portion 5 stops driving the registration roller 18 at a predetermined timing and moves the process to step S37.

<Step S37>

In step S37, the control portion 5 determines whether or not the conveyance of the document sheets is completed.

For example, the control portion 5 determines that the conveyance of the document sheets is completed when there is no document sheet on the document sheet placing portion 11. It is noted that the control portion 5 can determine whether there are any document sheets on the document sheet placing portion 11 using a sensor (not shown) provided for the document sheet placing portion 11.

Upon determining that the conveyance of the document sheets is completed (Yes in step S37), the control portion 5 ends the first conveyance control process. If the conveyance of the document sheets is not completed (No in step S37), the control portion 5 moves the process to step S31.

[Second Conveyance Control Process]

Figure 6:
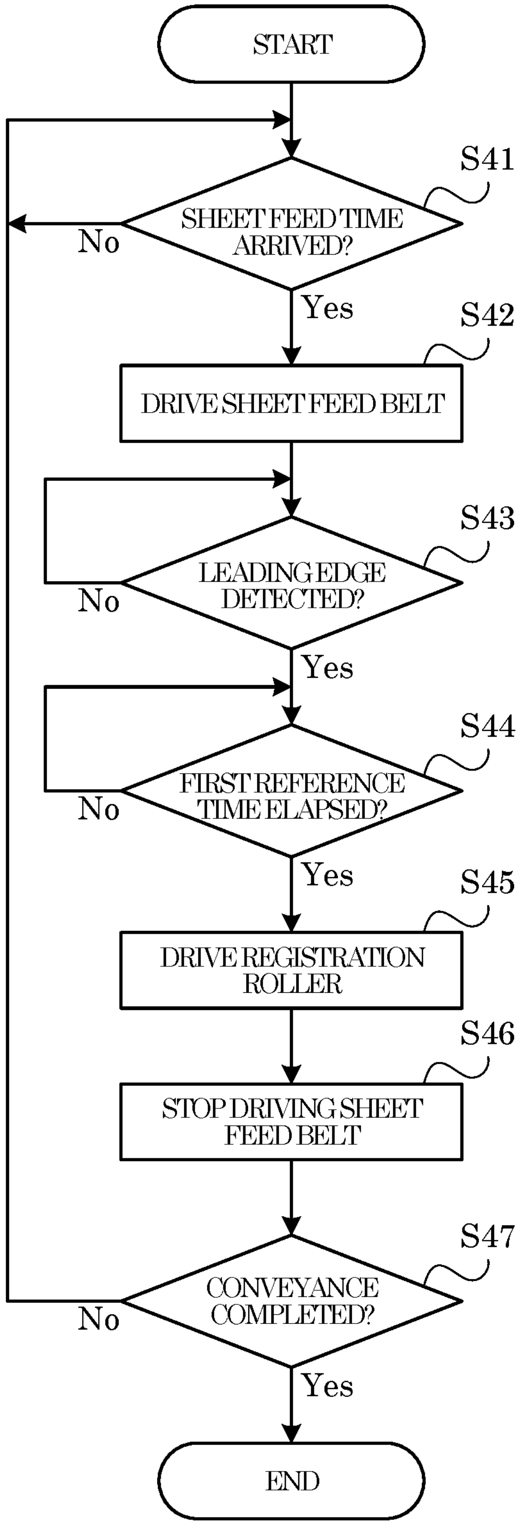
FIG. 6 is a flowchart showing an example of a second conveyance control process executed by the image forming apparatus according to the embodiment of the present disclosure.

Next, the second conveyance control process executed in step S17 of the conveyance control switching process will be described with reference to FIG. 6. The second conveyance control process controls the driving of the sheet feed belt 14 and the registration roller 18. It is noted that the control portion 5 executes the fifth conveyance control process, the second reading process, and the first reading process in addition to the second conveyance control process.

<Step S41>

First, in step S41, the control portion 5 determines whether or not the sheet feed time to feed a document sheet has arrived.

Upon determining that the sheet feed time has arrived (Yes in step S41), the control portion 5 moves the process to step S42. If the sheet feed time has not arrived (No in step S41), the control portion 5 waits for the sheet feed time to arrive in step S41.

<Step S42>

In step S42, the control portion 5 starts driving the sheet feed belt 14. Here, the process of step S42 is executed by the first drive control portion 45 of the control portion 5.

<Step S43>

In step S43, the control portion 5 determines whether or not the feed sensor 17 has detected the leading edge of the document sheet.

Upon determining that the feed sensor 17 has detected the leading edge of the document sheet (Yes in step S43), the control portion 5 moves the process to step S44. If the leading edge of the document sheet has not been detected (No in step S43), the control portion 5 waits for the feed sensor 17 to detect the leading edge of the document sheet in step S43.

<Step S44>

In step S44, the control portion 5 determines whether or not the first reference time has passed since the detection of the leading edge of the document sheet in step S43.

Upon determining that the first reference time has passed since the detection of the leading edge of the document sheet in step S43 (Yes in step S44), the control portion 5 moves the process to step S45. If the first reference time has not passed (No in step S44), the control portion 5 waits for the first reference time to pass in step S44.

<Step S45>

In step S45, the control portion 5 starts driving the registration roller 18. Here, the process of step S45 is executed by the second drive control portion 46 of the control portion 5.

<Step S46>

In step S46, the control portion 5 stops driving the sheet feed belt 14. Here, the process of step S46 is an example of the drive control step of the present disclosure and is executed by the first drive control portion 45 of the control portion 5.

For example, the control portion 5 stops driving the sheet feed belt 14 after a predetermined period of time has passed since the start of the driving of the registration roller 18 in step S45.

After executing the process of step S46, the control portion 5 stops driving the registration roller 18 at a predetermined timing and moves the process to step S47.

<Step S47>

In step S47, the control portion 5 determines whether or not the conveyance of the document sheets is completed.

Upon determining that the conveyance of the document sheets is completed (Yes in step S47), the control portion 5 ends the second conveyance control process. If the conveyance of the document sheets is not completed (No in step S47), the control portion 5 moves the process to step S41.

[Third Conveyance Control Process]

Figure 7:
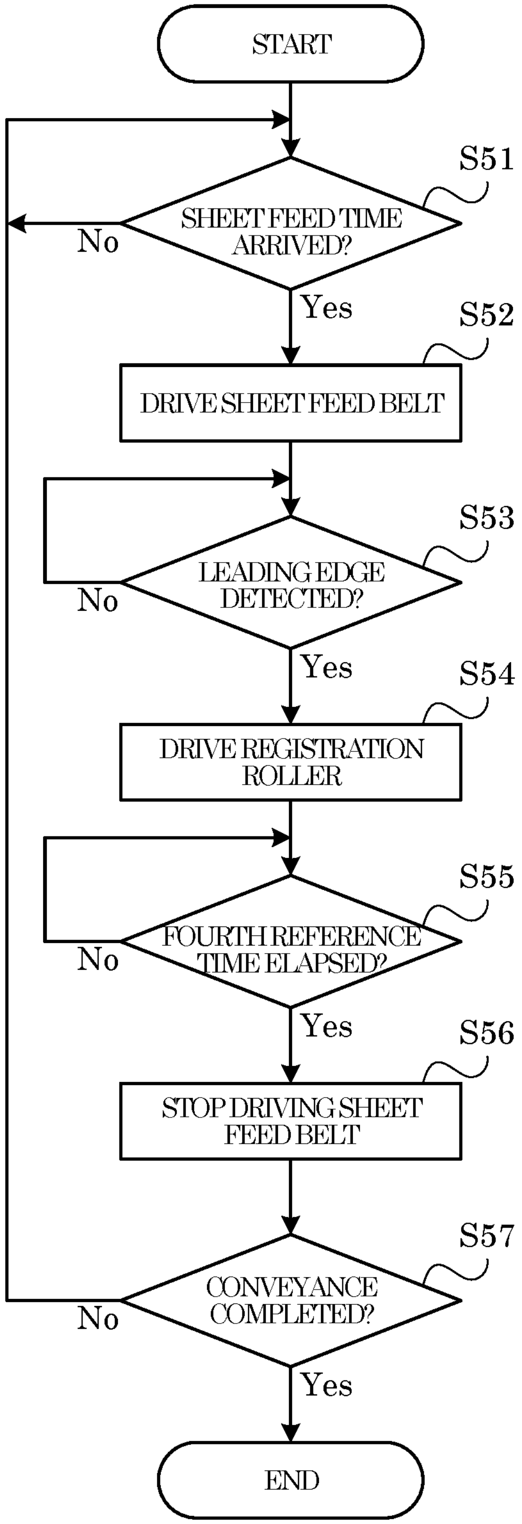
FIG. 7 is a flowchart showing an example of a third conveyance control process executed by the image forming apparatus according to the embodiment of the present disclosure.

Next, the third conveyance control process executed in step S19 of the conveyance control switching process will be described with reference to FIG. 7. The third conveyance control process controls the driving of the sheet feed belt 14 and the registration roller 18. It is noted that the control portion 5 executes the fifth conveyance control process, the second reading process, and the first reading process in addition to the third conveyance control process.

<Step S51>

First, in step S51, the control portion 5 determines whether or not the sheet feed time to feed a document sheet has arrived.

Upon determining that the sheet feed time has arrived (Yes in step S51), the control portion 5 moves the process to step S52. If the sheet feed time has not arrived (No in step S51), the control portion 5 waits for the sheet feed time to arrive in step S51.

<Step S52>

In step S52, the control portion 5 starts driving the sheet feed belt 14. Here, the process of step S52 is executed by the first drive control portion 45 of the control portion 5.

<Step S53>

In step S53, the control portion 5 determines whether or not the feed sensor 17 has detected the leading edge of the document sheet.

Upon determining that the feed sensor 17 has detected the leading edge of the document sheet (Yes in step S53), the control portion 5 moves the process to step S54. If the leading edge of the document sheet has not been detected (No in step S53), the control portion 5 waits for the feed sensor 17 to detect the leading edge of the document sheet in step S53.

<Step S54>

In step S54, the control portion 5 starts driving the registration roller 18. Here, the process of step S54 is executed by the second drive control portion 46 of the control portion 5.

<Step S55>

In step S55, the control portion 5 determines whether or not the fourth reference time has passed since the detection of the leading edge of the document sheet in step S53.

Upon determining that the fourth reference time has passed since the detection of the leading edge of the document sheet in step S53 (Yes in step S55), the control portion 5 moves the process to step S56. If the fourth reference time has not passed (No in step S55), the control portion 5 waits for the fourth reference time to pass in step S55.

<Step S56>

In step S56, the control portion 5 stops driving the sheet feed belt 14. Here, the process of step S56 is an example of the drive control step of the present disclosure and is executed by the first drive control portion 45 of the control portion 5.

After executing the process of step S56, the control portion 5 stops driving the registration roller 18 at a predetermined timing and moves the process to step S57.

<Step S57>

In step S57, the control portion 5 determines whether or not the conveyance of the document sheets is completed.

Upon determining that the conveyance of the document sheets is completed (Yes in step S57), the control portion 5 ends the third conveyance control process. If the conveyance of the document sheets is not completed (No in step S57), the control portion 5 moves the process to step S51.

[Fourth Conveyance Control Process]

Figure 8:
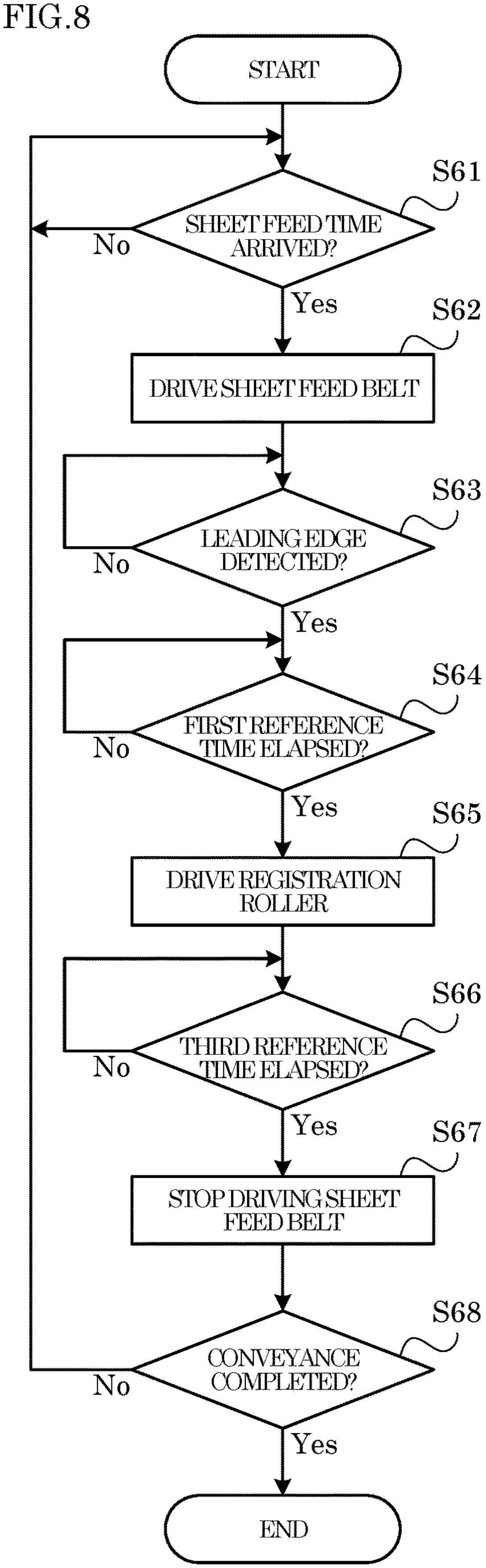
FIG. 8 is a flowchart showing an example of a fourth conveyance control process executed by the image forming apparatus according to the embodiment of the present disclosure.

Next, the fourth conveyance control process executed in step S20 of the conveyance control switching process will be described with reference to FIG. 8. The fourth conveyance control process controls the driving of the sheet feed belt 14 and the registration roller 18. It is noted that the control portion 5 executes the fifth conveyance control process, the second reading process, and the first reading process in addition to the fourth conveyance control process.

<Step S61>

First, in step S61, the control portion 5 determines whether or not the sheet feed time to feed a document sheet has arrived.

Upon determining that the sheet feed time has arrived (Yes in step S61), the control portion 5 moves the process to step S62. If the sheet feed time has not arrived (No in step S61), the control portion 5 waits for the sheet feed time to arrive in step S61.

<Step S62>

In step S62, the control portion 5 starts driving the sheet feed belt 14. Here, the process of step S62 is executed by the first drive control portion 45 of the control portion 5.

<Step S63>

In step S63, the control portion 5 determines whether or not the feed sensor 17 has detected the leading edge of the document sheet.

Upon determining that the feed sensor 17 has detected the leading edge of the document sheet (Yes in step S63), the control portion 5 moves the process to step S64. If the leading edge of the document sheet has not been detected (No in step S63), the control portion 5 waits for the feed sensor 17 to detect the leading edge of the document sheet in step S63.

<Step S64>

In step S64, the control portion 5 determines whether or not the first reference time has passed since the detection of the leading edge of the document sheet in step S63.

Upon determining that the first reference time has passed since the detection of the leading edge of the document sheet in step S63 (Yes in step S64), the control portion 5 moves the process to step S65. If the first reference time has not passed (No in step S64), the control portion 5 waits for the first reference time to pass in step S64.

<Step S65>

In step S65, the control portion 5 starts driving the registration roller 18. Here, the process of step S65 is executed by the second drive control portion 46 of the control portion 5.

<Step S66>

In step S66, the control portion 5 determines whether or not the third reference time has passed since the detection of the leading edge of the document sheet in step S63.

Upon determining that the third reference time has passed since the detection of the leading edge of the document sheet in step S63 (Yes in step S66), the control portion 5 moves the process to step S67. If the third reference time has not passed (No in step S66), the control portion 5 waits for the third reference time to pass in step S66.

<Step S67>

In step S67, the control portion 5 stops driving the sheet feed belt 14. Here, the process of step S67 is an example of the drive control step of the present disclosure and is executed by the first drive control portion 45 of the control portion 5.

After executing the process of step S67, the control portion 5 stops driving the registration roller 18 at a predetermined timing and moves the process to step S68.

<Step S68>

In step S68, the control portion 5 determines whether or not the conveyance of the document sheets is completed.

Upon determining that the conveyance of the document sheets is completed (Yes in step S68), the control portion 5 ends the fourth conveyance control process. If the conveyance of the document sheets is not completed (No in step S68), the control portion 5 moves the process to step S61.

In this manner, in the image forming apparatus 100, in the case where the length of document sheets in the conveying direction D1 is shorter than or equal to the specific distance, the driving of the sheet feed belt 14 is stopped after the leading edge of a document sheet has reached the second position P2 (see FIG. 3) and before the trailing edge of the document sheet passes through the first position P1. This prevents the following document sheet from being conveyed downstream of the first position P1 in the conveying direction D1 before the driving of the sheet feed belt 14 is stopped in the case where the trailing edge of the preceding document sheet passes through the first position P1 before the leading edge of the preceding document sheet comes into contact with the first conveying roller 20.

In addition, in the image forming apparatus 100, in the case where the length of the document sheets in the conveying direction D1 exceeds the specific distance, the driving of the sheet feed belt 14 is stopped after the leading edge of a document sheet has reached the third position P3 (see FIG. 3) and before the trailing edge of the document sheet passes through the first position P1. This prevents conveyance delay caused by the slip of the registration roller 18 in the case where the trailing edge of the document sheet passes through the first position P1 after the leading edge of the document sheet comes into contact with the first conveying roller 20.

Accordingly, the image forming apparatus 100 can prevent both paper jams and a reduction in the productivity.

In addition, the image forming apparatus 100 determines the timing to stop driving the sheet feed belt 14 on the basis of the time elapsed since the detection of the leading edge of the document sheet by the feed sensor 17. This reduces the number of sensors compared with a configuration provided with sensors for determining that the leading edge of the document sheet has reached the second position P2 or the third position P3. The number of sensors can be further reduced by using the feed sensor 17 to control the driving of the registration roller 18.

In addition, in the image forming apparatus 100, in the case where the length of the document sheets in the conveying direction D1 is shorter than or equal to the specific distance while the conveyance mode is not the first mode, the driving of the sheet feed belt 14 is stopped when the time elapsed since the detection of the leading edge of a document sheet by the feed sensor 17 exceeds the second reference time longer than the conveyance time taken by the sheet feed belt 14 to convey the document sheet from the fourth position P4 to the second position P2. In the case where the skew correction is not performed, this prevents the sheet feed retry caused by the slip of the sheet feed belt 14 on the document sheet.

In addition, in the image forming apparatus 100, the second reference time is set on the basis of the thickness of the document sheets. This prevents the sheet feed retry caused by the slip of the sheet feed belt 14 on the document sheets and thus reduces the amount of drive to the feed motor 16.

It is noted that the present disclosure is also applicable to the sheet feed portion 4. In this case, the sheet of the present disclosure corresponds to sheets supplied by the sheet feed portion 4 to the image forming portion 3.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising:

a first conveyance member configured to come into contact with a sheet conveyed in a conveying direction set in advance to convey the sheet downstream in the conveying direction;

a separation member disposed to face the first conveyance member with a first position therebetween and biased toward the first position, the first conveyance member coming into contact with the sheet at the first position, the separation member being configured to separate a first sheet that is in contact with the first conveyance member from a second sheet that is different from the first sheet, the sheet being one of a plurality of sheets conveyed in the conveying direction, the plurality of sheets including the first and second sheets and being conveyed to the first position;

a second conveyance member configured to come into contact with the sheet at a second position downstream of the first position in the conveying direction to convey the sheet downstream in the conveying direction;

a third conveyance member configured to come into contact with the sheet at a third position downstream of the second position in the conveying direction to convey the sheet downstream in the conveying direction;

a determination processing portion configured to determine whether or not a length of the sheet in the conveying direction is shorter than or equal to a specific distance based on a distance of a section from the first position to the third position on a conveyance route of the sheet; and a first drive control portion, in a case where the determination processing portion determines that the length is shorter than or equal to the specific distance, configured to stop driving the first conveyance member after a leading edge of the sheet in the conveying direction reaches the second position and before a trailing edge of the sheet in the conveying direction passes through the first position, and in a case where the determination processing portion determines that the length exceeds the specific distance, configured to stop driving the first conveyance member after the leading edge reaches the third position and before the trailing edge passes through the first position.

2. The sheet conveying device according to claim 1, further comprising:

a sensing portion configured to detect the leading edge at a fourth position downstream of the first position in the conveying direction and upstream of the second position in the conveying direction, wherein the first drive control portion determines a timing to stop driving the first conveyance member on the basis of a time elapsed since the detection of the leading edge by the sensing portion.

3. The sheet conveying device according to claim 2, further comprising:

a second drive control portion configured to start driving the second conveyance member when the time elapsed since the detection of the leading edge by the sensing portion exceeds a first reference time, which is longer than a conveyance time taken by the first conveyance member to convey the sheet from the fourth position to the second position, wherein in the case where the determination processing portion determines that the length is shorter than or equal to the specific distance, the first drive control portion stops driving the first conveyance member when the time elapsed since the detection of the leading edge by the sensing portion exceeds the first reference time.

4. The sheet conveying device according to claim 3, wherein in a case where a conveyance mode of the sheet is a specific mode set in advance, the second drive control portion starts driving the second conveyance member when the time elapsed since the detection of the leading edge by the sensing portion exceeds the first reference time, and in a case where the conveyance mode is not the specific mode, the second drive control portion starts driving the second conveyance member before the leading edge reaches the second position, and in a case where the determination processing portion determines that the length is shorter than or equal to the specific distance while the conveyance mode is not the specific mode, the first drive control portion stops driving the first conveyance member when the time elapsed since the detection of the leading edge by the sensing portion exceeds a second reference time, which is longer than the conveyance time.

5. The sheet conveying device according to claim 4, further comprising:

an acquisition processing portion configured to acquire a thickness of the sheet; and a setting processing portion configured to set the second reference time on the basis of the thickness of the sheet acquired by the acquisition processing portion.

6. The sheet conveying device according to claim 1, wherein the first conveyance member includes a belt member.

7. An image reading apparatus comprising:

the sheet conveying device according to claim 1; and an image reading portion configured to read an image on the sheet conveyed by the sheet conveying device.

8. A sheet conveying method performed by a sheet conveying device, the sheet conveying device comprising:

a first conveyance member configured to come into contact with a sheet conveyed in a conveying direction set in advance to convey the sheet downstream in the conveying direction;

a separation member disposed to face the first conveyance member with a first position therebetween and biased toward the first position, the first conveyance member coming into contact with the sheet at the first position, the separation member being configured to separate a first sheet that is in contact with the first conveyance member from a second sheet that is different from the first sheet, the sheet being one of a plurality of sheets conveyed in the conveying direction, the plurality of sheets including the first and second sheets and being conveyed to the first position;

a second conveyance member configured to come into contact with the sheet at a second position downstream of the first position in the conveying direction to convey the sheet downstream in the conveying direction; and a third conveyance member configured to come into contact with the sheet at a third position downstream of the second position in the conveying direction to convey the sheet downstream in the conveying direction, the sheet conveying method comprising:

a determination step of determining whether or not a length of the sheet in the conveying direction is shorter than or equal to a specific distance based on a distance of a section from the first position to the third position on a conveyance route of the sheet; and a drive control step of stopping driving the first conveyance member after a leading edge of the sheet in the conveying direction reaches the second position and before a trailing edge of the sheet in the conveying direction passes through the first position in a case where it is determined that the length is shorter than or equal to the specific distance in the determination step, and stopping driving the first conveyance member after the leading edge reaches the third position and before the trailing edge passes through the first position in a case where it is determined that the length exceeds the specific distance in the determination step.

* * * * *